United States Patent

[11] 3,584,200

| [72] | Inventor | John D. Layman<br>Waynesboro, Va. |
|---|---|---|
| [21] | Appl. No. | 709,403 |
| [22] | Filed | Feb. 29, 1968 |
| [45] | Patented | June 8, 1971 |
| [73] | Assignee | General Electric Company |

[54] METHOD AND APPARATUS FOR SERIAL SHIFT REGISTER CODING
9 Claims, 1 Drawing Fig.

[52] U.S. Cl. .................................................. 235/92SH,
235/92 DN, 235/151.1
[51] Int. Cl. ...................................................... H03k 23/02
[50] Field of Search ............................................ 307/221;
328/37; 235/151.1, 92; 340/174 SR

[56] References Cited
UNITED STATES PATENTS

| 3,114,130 | 12/1963 | Abramson .................. | 340/146.1 |
| 3,161,763 | 12/1964 | Glaser .......... ............ | 235/157 |
| 3,462,749 | 8/1969 | Mecklenburg .............. | 340/174 |

*Primary Examiner*—Maynard R. Wilbur
*Assistant Examiner*—Robert F. Gnuse
*Attorneys*—William S. Wolfe, Gerald R. Woods and John B. Forman, Frank L. Neuhauser and Oscar B. Waddell

ABSTRACT: An arrangement for using a shift register to represent movement of a monitored item wherein switching of successive stages of the register indicates movement of a predetermined magnitude and wherein interpolation data is also selectively stored in the register to indicate quantities between said predetermined magnitude.

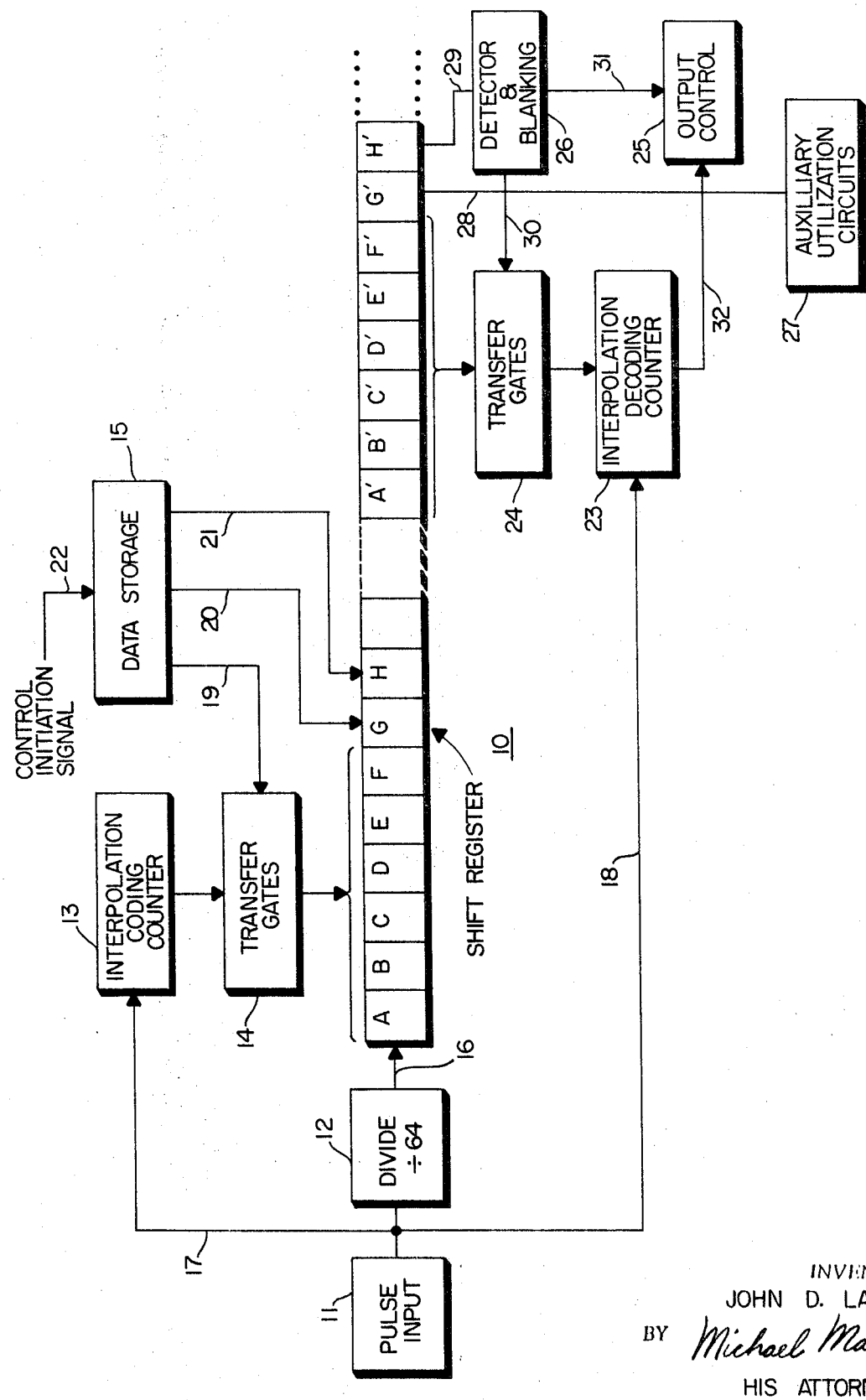

METHOD AND APPARATUS FOR SERIAL SHIFT REGISTER CODING

BACKGROUND OF THE INVENTION

In the automatic control art, it sometimes becomes necessary to monitor the movement of a product or thing over an extended distance. For example, one may be interested in monitoring the progress of articles on a conveyor belt throughout a warehouse, or the progress of a sheet of produced material during the production of such a material. One method of monitoring such progress is to use a serial shift register. The stages of the register are assigned a representative "distance value" and enough stages are provided to represent the total distance to be monitored.

For example, if 100 feet of a conveyor system is to be monitored, each shift register stage may be assigned a value of 2 inches and every time the conveyor moves 2 inches, a shift pulse can be applied to the register. With this arrangement, a 600 stage register is needed. To represent the presence of an article, a stage in the appropriate position would be "set" while all other stages remain in a "reset" state. Then, by applying one shift pulse in synchronism with each 2 inches of conveyor movement, the "set" condition can be shifted to successive stages to indicate the actual movement of the article.

This type of shift register utilization has found a particular application in connection with the production of material such as glass. As the glass passes from the annealing oven, it is conveyed in a continuous sheet to cutters which selectively operate to cut the sheet into prescribed lengths. It is desirable to operate the cutters with a high degree of accuracy so that the resulting plates of glass can be used without further need for cutting or trimming.

When glass processing is being controlled, the stages of a shift register may be assigned "distance values" corresponding to lengths of glass and the shift pulses may be generated at a rate determined by the rate of glass movement. In this way, it is possible to preset selected stages of the shift register in accordance with the places where the glass is to be cut. Then, as the glass approaches the cutting station, the state of the shift register stages is sensed and the cutters are operated at the position corresponding to the stage that is set.

It will be appreciated that to attain any reasonable degree of accuracy with the system just described, an inordinately large number of shift register stages would be required. However, certain limitations may be imposed upon the size of the plates to be cut which will make it possible to substantially reduce the size of the required shift register while simultaneously increasing the resolution or accuracy with which the cuts may be made. Thus, one may assign a "distance value" of 2 inches to each stage of the shift register and also recognize that although plates are to be cut with a tolerance of ±0.020 of an inch, they will never be smaller than 17 inches in length.

The present invention is ideally suited for use in control systems which have close tolerance dimensions; but which have a total range of possible dimensions commencing at a minimum level that is greater than several units of the "distance value" per stage.

SUMMARY OF THE INVENTION

The present invention relates to a method and apparatus for extending the capacity of a shift register; more particularly, it relates to a method and apparatus for developing and storing interpolation data that can be used as a vernier to improve the dimensional accuracy of data supplied by the shift register.

For illustrative purposes the invention will be described within the glass cutting environment described above. It will be assumed that a continuous glass sheet is to be automatically cut into lengths ranging upward from 17 inches and with an accuracy of 0.020 of an inch. In order to effect the desired monitoring control, a shift register will be employed that is responsive to shift pulses that are generated at a rate of one pulse for each 2 inches of glass travel. In other words, each stage of the shift register will be assigned a "distance value" of 2 inches. Stages of the shift register corresponding to the position of a cut are placed in a "set" state and this state is then detected when the corresponding portion of the glass is in the vicinity of the cutters in order to initiate cutter control operations.

Since it is stipulated that there will be no cuts that are closer together than 17 inches, and since the shift register has a stage for every 2 inches, there will necessarily be at least seven unused stages between each "set" stage. The present invention employs these unused stages to convey detailed dimensional data to the cutter control mechanism that will permit cutting within a tolerance of 0.020 of an inch.

It is an object of the present invention to provide a new method and apparatus for serial shift register coding.

It is another object of the invention to provide an improved control system wherein basic control data is supplied to a shift register and this data is subsequently decoded to develop a time-related analog signal representative of a dimension.

It is another object of the invention to provide a shift register operative in response to input pulses occurring at a predetermined rate and further operative to furnish dimensional data having an accuracy greater than that inherently provided by the speed of switching between individual shift pulses.

It is a further object of this invention to provide an improved signal processing arrangement.

In accordance with the invention there is provided a method of coding a shift register that operates responsive to successive shift pulses, comprising entering data representing a given timed event into at least a first stage of the register at a particular time and entering data into stages of the register following said first stage (that is, with respect to the direction of shifting of the stages) with a coded representation of the time that elapsed between occurrence of the preceding shift pulse and the time of entering of data into the first stage.

According to another aspect of the invention, there is provided a system for coding a shift register comprising a source of first or input pulses having a first recurrence rate, means responsive to a predetermined number of applied first or input pulses for generating second or shift pulses having a recurrence rate which bears an integral submultiple relationship with said first rate and applying said second pulses to the register, means to apply said first or input pulses as interpolation pulses between second or recurring shift pulses, means for setting a first stage of the register, and means operative upon the setting of the first stage to set a plurality of stages, following said first stage with a coded representation of the number of interpolation pulses that were generated since the occurrence of the preceding second or shift pulse.

A more complete understanding of the operation and features of the invention will be available from the following detailed description of the illustrative embodiment shown in the drawing.

BRIEF DESCRIPTION OF THE DRAWING

FIG. 1 is a block schematic illustrating a basic general circuit arrangement for practicing the invention.

DETAILED DESCRIPTION OF THE INVENTION

The drawing illustrates a shift register 10 disposed across the center portion thereof. This shift register contains a large number of stages and may be of any conventional construction. In the present embodiment the stages comprise bistable devices which are interconnected in such a manner that upon occurrence of a shift pulse at the input of the register, the state of each stage is transferred to the next succeeding stage, i.e., from left to right. As illustrated, a plurality of the first and last stages of the register are shown.

The shift pulses for the register are provided by a pulse input source 11. In an application of the type described above concerning the cutting of glass, the pulse input 11 may in fact be a pulse generating source that produces first pulses at a rate proportional to the rate of glass movement as it emerges from an annealing oven. Thus, using the assumptions mentioned above, a pulse would be generated representative of each one-thirtysecond of an inch of glass. The input pulses are divided down by a ratio of 64 to 1 to provide a second pulse representative of each 2 inches of glass movement. Thus, as the glass moves, successive stages of the shift register will be set every time 2 one thirty-second inches are traversed.

The data to be stored within the register concerns the location at which the glass is to be cut. This data along with other information concerning operations that may be performed upon the glass, or by the cutting mechanism, is stored in binary form in data storage unit 15. When the data is to be transferred to the shift register, a control initiation signal is generated on lead 22. At this time, lead 21 is energized and "sets" stage H of the shift register. Prior to this time, all stages A—H were in reset condition so that the setting of stage H is a discrete indication that a cut is to be made at the portion of the glass corresponding to this stage. As succeeding shift pulses are applied to the register, this set condition is moved along the register in synchronism with the actual movement of the glass. At a subsequent point, the set condition will appear in another register stage H' at which time it will be detected and used to initiate control over the cutter mechanism.

Since the shift pulses are generated for every 2 inches of glass travel, it is clear that the setting of stage H conveys information having an accuracy within a range of 2 inches only. In order to provide interpolation data that indicates precisely where the cut is to be made, stages A—F following H with respect to the direction of shifting of data in register 10 are preset with a coded registration that represents the time interval that has elapsed between the time of occurrence of the preceding shift pulse and the time of energization of lead 21. This is accomplished in the following manner.

The pulses provided by pulse input 11 are divided down by divider 12 and then applied over a lead 16 to a shift register 10. The divider 12 produces a pulse train having a pulse repetition rate that is one sixty-fourth of its input rate. The pulses supplied by pulse input 11 are called control or interpolation pulses because they make it possible to interpolate precise data intermediate the 2 inch range of the basic data established by the output of divider 64. Each pulse from pulse input 11 is applied to an interpolation coding counter 13. The latter unit is simply a conventional counter wherein the stages comprise bistable devices which are interconnected to register a distinct count for each pulse applied by a change in the states of the devices.

When the control initiation signal is generated and data is transferred from data storage 15, a gating signal is applied via lead 19 to transfer gates 14. These gates interconnect the stages of interpolation coding counter 13 to stages A—F of the shift register. Accordingly, at the instant that stage H is set, or any time before the next interpolation pulse occurs, the count registered in the interpolation coding counter 13 is transferred into stages A—F. It will thus be seen that stages A—F contain a coded representation of the number of interpolation pulses which have occurred since the preceding shift pulse was generated. Obviously, the specific coding used in the interpolation coding counter is immaterial. It is simply important to note that the information must be in a form suitable for recording in the binary stages A—F of the shift register.

The present invention also contemplates the use of other stages of the shift register, such as stage G, for the transmission of auxiliary data. This data may take many forms and it is not necessary that only one stage be employed. The actual number of stages used in conveying the interpolation data and auxiliary data will be determined by the minimum dimensional quantities to be transmitted. In the present example it has been assumed that no cuts will be made less than 17 inches apart. This means that there will always be at least seven stages between each stage that is set to indicate a cut. The auxiliary data may be placed in the shift register 10 via lead 20 along with setting of stages A—F and H, or it may be inserted at some subsequent time.

At the output end of the shift register, a series of stages has been identified as A'—H'. When the set condition that was initially placed within stage H occurs at stage H', it is indicative that the control portion should be initiated because the glass has now attained a predetermined position. The set condition of stage H' is detected over lead 29 by a detector and blanking circuit 26. When the condition is detected, signals are produced on leads 30 and 31 to activate transfer gates 24 and output control circuit 25 respectively. The signal on lead 30 activates transfer gates 24 to read out the condition of stages A'—F' into an interpolation decoding counter 23. It will thus be appreciated that interpolation decoding counter 23 is now preset with a number corresponding to the number that appeared in interpolation coding counter 13 at the time stage H was initially set.

The interpolation or control pulses used to count interpolation coding counter 13 up are also used to count interpolation decoding counter 23 down. This means that an output will be provided on lead 32 at a time that is equal to the original period of time between the initial setting of stage H and the generation of the preceding shift pulse. Accordingly, data is provided over leads 31 and 32 to output control circuit 25 which discretely identifies the instant of time identified by the data in data storage 15. Where the data represents the position at which a cut is to be made, it will be seen that the position is identified with an accuracy that is determined by the repetition rate of the interpolation pulses.

Summarizing therefore, the invention provides an arrangement whereby the occurrence of an event, such as the setting of the H stage in the shift register is recorded in time as occurring a given number of control pulses following a preceding shift pulse occurrence and can be read at a later time to provide a signal representing the same number of control pulse periods following a point in time corresponding to a given number of shift pulse periods after the first mentioned shift pulse. This read time event can be used to initiate action as for example the cutting of glass where glass movement is synchronized with the shift pulse timing.

It is possible that the counters 13 and 23 can be other than up and down counters respectively. For example, if the counter 23 was selected to be an up counter, the same as 13, then the reproduced time signal would represent a complementary interpolation with respect to that which is recorded.

While the invention has been described in terms of binary coded fractions for purposes of simplicity, other codes are equally applicable, such as for example binary coded decimal. In this latter case, counters 13 and 23 would be binary coded decimal counters. Also the number of stages in the shift register comprising a coded group of data as well as the total number of stages may be altered according to need.

As also shown in the drawing, at the time the set condition is detected in stage H', the following stage G' may be sensed in order to extract the auxiliary data stored therein. This data may then be presented to auxiliary utilization circuits 27 to effect whatever control functions may be desired.

A further feature of the invention concerns the fact that the detector 26 includes a blanking arrangement so that the detector will be rendered inoperative during the period of time required for the information stored in stages A'—G' to be shifted beyond the stage of detection H' of the register.

It will be appreciated that a number of modifications may be made in order to adapt the present invention to various applications involving the storing, modifying and subsequent retrieval of information, at least part of which is being modified in real time. It is not intended to specifically restrict the invention to the specific units of measurement discussed nor to the specific interrelated elements disclosed. The novel features embraced by the invention are set forth in the appended claims and any modifications coming within the definition of these claims are believed to be within the spirit and scope of the teachings herein.

I claim:
1. In combination a source of recurrent control pulses, a shift register, means responsive to said recurrent control pulses to provide recurrent shift pulses having a longer period than said control pulses, means to set a stage in said shift register representing an event means to provide data defining in time the setting of said shift register including means to count the number of control pulse periods following a preceding shift pulse occurrence, means for entering said data into said shift register in the stages following the event stage, means responsive to said shift pulses to shift said event stage setting and said entered data along said shift register, and means for reading said event stage setting and said entered data at a later time to provide a signal representing the same number of control pulse periods following a point in time corresponding to a given number of control pulse periods after said preceding shift pulse occurrence.

2. A method of coding a plural stage shift register comprising producing first pulses having a first recurrence rate, producing second pulses having a second recurrence rate, said first rate having an integral relationship with said second rate, entering data representing a given timed event which is independent of the occurrence time of said first and second pulses into at least one given stage of said register, generating a coded representation of the number of first pulses produced between the time of entering of said data into said at least one stage and the occurrence time of the previously produced second pulse, entering said coded representation into at least one stage of said register following said at least one given stage in the direction of shifting of said register, shifting in response to said second pulses said entered data and entered coded representation through stages of said register simultaneously at said second recurrence rate, detecting said entered data after having been shifted to at least one subsequent stage of the register, detecting, in response to said detection of said entered data, said entered coded representation after having been shifted to at least one subsequent stage of the register, converting said detected coded representation into a corresponding numerical number representation, and utilizing said numerical number representation.

3. The method according to claim 2 further comprising the step of inhibiting the further detection of said coded representation until said entered coded representation has been shifted beyond said at least said first-mentioned one subsequent stage of said register.

4. The method according to claim 2 further comprising the step of entering said coded representation and said data representing a given timed event into said register during the same time period between successive first rate pulses.

5. In combination, a plural stage shift register, means for providing first pulses having a first recurrence rate, means for providing second pulses having a second recurrence rate which is a submultiple of said first recurrence rate, means for entering data representing a given timed event which is independent of the occurrence time of said first and second pulses into at least one given stage of said register, means for generating a coded representation of the number of first pulses produced between the time of entering of said data into said at least one stage and the occurrence time of the previously produced second pulse, means for entering said coded representation into stages of said register following said at least one given stage in the direction of shifting of said register, means responsive to said second pulses for shifting said entered data and entered coded representation through stages of said register simultaneously at said second recurrence rate, means for detecting said entered data after having been shifted to a subsequent stage of the register, means responsive to said detection of said entered data for reading said entered coded representation after having been shifted to subsequent stages of the register, and means for utilizing said read coded representation.

6. A system for coding a shift register comprising means for generating recurring shift pulses, means for generating a plurality of interpolation pulses occurring between recurring shift pulses, means for setting a marker signal in a given stage of said register, means for deriving a coded representation of the number of interpolation pulses that were generated since the occurrence of the preceding shift pulse and the time of setting of said marker signal in said given stage of said register, means operative upon the setting of said given stage to set said coded representation into a plurality of stages of said register following said given stage, means for simultaneously shifting said set marker signal and said set coded representation through a plurality of said shift register stages, and means for utilizing said set data and said coded representation after having been shifted through a plurality of stages of said register.

7. A system for coding a shift register according to claim 6 wherein said means for deriving and said means for setting said coded representation comprises a counter, means for supplying said interpolation pulses to said counter, and means for registering the count level of said counter in said following stages when said given stage is set.

8. A system for coding a shift register according to claim 7, wherein said means for utilizing comprises means connected to detect the occurrence of said marker signal after having been shifted to a succeeding stage of said register, a counter, means for setting said last-named counter when said shifted marker signal is detected in accordance with the states of the stages representing said coded representation and following said succeeding stage, and means for producing an output signal related to the time of occurrence of said preceding shift pulse.

9. A system according to claim 8 wherein the detection means includes means for automatically inhibiting operation thereof after a set condition is detected, for a period of time commensurate with the number of shift pulses needed to shift out all of the coded representation information appearing in the following stages.